US011230651B2

United States Patent
Shanai et al.

(10) Patent No.: US 11,230,651 B2
(45) Date of Patent: Jan. 25, 2022

(54) ADHESIVE FILM AND A FLAT WIRING MEMBER USING THE SAME

(71) Applicant: Hitachi Metals, Ltd., Tokyo (JP)

(72) Inventors: Daisuke Shanai, Tokyo (JP); Akinari Nakayama, Tokyo (JP); Kenichi Murakami, Tokyo (JP); Kazuhiko Sasada, Tokyo (JP); Masanobu Yamanobe, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 389 days.

(21) Appl. No.: 15/805,547

(22) Filed: Nov. 7, 2017

(65) Prior Publication Data

US 2018/0057720 A1    Mar. 1, 2018

(30) Foreign Application Priority Data

Apr. 4, 2016 (JP) .............................. JP2016-075241
Dec. 28, 2016 (JP) .............................. JP2016-255344

(51) Int. Cl.
*C09J 167/00* (2006.01)
*B32B 15/20* (2006.01)
(Continued)

(52) U.S. Cl.
CPC .............. *C09J 167/00* (2013.01); *B32B 3/10* (2013.01); *B32B 7/12* (2013.01); *B32B 15/08* (2013.01);
(Continued)

(58) Field of Classification Search
CPC . C09J 167/00; C09J 11/06; C09J 11/04; C09J 9/00; C09J 7/0282; C09J 2203/302;
(Continued)

(56) References Cited

U.S. PATENT DOCUMENTS

2005/0064198 A1* 3/2005 Takada .................... B32B 27/08
428/411.1
2005/0165196 A1    7/2005 Kinoshita et al.
(Continued)

FOREIGN PATENT DOCUMENTS

JP    H03-179069 A    8/1991
JP    2004-051970 A    2/2004
(Continued)

OTHER PUBLICATIONS

Vylon—Amorphous co-polyester (Solvent soluble type) (Year: 2005).*
(Continued)

*Primary Examiner* — Samir Shah
(74) *Attorney, Agent, or Firm* — McGinn IP Law Group, PLLC (57) ABSTRACT

An adhesive film includes a resin film; and an adhesive layer provided on the resin film. The adhesive layer includes a resin composition including 2 parts by mass or more of an epoxy resin including two or more epoxy groups in molecules and having epoxy equivalents of 300 g/eq or less, per 100 parts by mass of an amorphous resin, which is soluble to a solvent and has a plurality of carboxyl groups in molecules, and which has a glass transition temperature of 100° C. or less and an acid value of 5 KOHmg/g or more. A flat wiring member includes a conductor and the adhesive film as described above.

12 Claims, 3 Drawing Sheets

(51) Int. Cl.
| | |
|---|---|
| *B32B 15/08* | (2006.01) |
| *B32B 27/06* | (2006.01) |
| *C09J 7/25* | (2018.01) |
| *B32B 15/18* | (2006.01) |
| *C08K 3/013* | (2018.01) |
| *B32B 27/28* | (2006.01) |
| *C09J 175/06* | (2006.01) |
| *B32B 3/10* | (2006.01) |
| *C08K 5/5313* | (2006.01) |
| *B32B 15/09* | (2006.01) |
| *B32B 7/12* | (2006.01) |
| *B32B 27/36* | (2006.01) |
| *B32B 27/38* | (2006.01) |
| *B32B 27/40* | (2006.01) |
| *C09J 9/00* | (2006.01) |
| *C09J 11/04* | (2006.01) |
| *C09J 11/06* | (2006.01) |

(52) U.S. Cl.
CPC .............. *B32B 15/09* (2013.01); *B32B 15/18* (2013.01); *B32B 15/20* (2013.01); *B32B 27/06* (2013.01); *B32B 27/281* (2013.01); *B32B 27/286* (2013.01); *B32B 27/36* (2013.01); *B32B 27/38* (2013.01); *B32B 27/40* (2013.01); *C08K 3/013* (2018.01); *C08K 5/5313* (2013.01); *C09J 7/25* (2018.01); *C09J 9/00* (2013.01); *C09J 11/04* (2013.01); *C09J 11/06* (2013.01); *C09J 175/06* (2013.01); *B32B 2250/03* (2013.01); *B32B 2250/40* (2013.01); *B32B 2255/06* (2013.01); *B32B 2255/205* (2013.01); *B32B 2307/306* (2013.01); *B32B 2307/3065* (2013.01); *B32B 2307/412* (2013.01); *B32B 2307/422* (2013.01); *B32B 2307/732* (2013.01); *B32B 2405/00* (2013.01); *B32B 2457/00* (2013.01); *C08K 2201/006* (2013.01); *C09J 2203/302* (2013.01); *C09J 2203/326* (2013.01); *C09J 2301/408* (2020.08); *C09J 2463/00* (2013.01); *C09J 2467/00* (2013.01); *C09J 2475/00* (2013.01); *C09J 2479/08* (2013.01); *C09J 2479/086* (2013.01)

(58) Field of Classification Search
CPC .............. C09J 2205/102; C09J 2467/00; C09J 2479/08; B32B 7/12; B32B 27/36; B32B 27/38; B32B 2307/412; B32B 2307/3065; B32B 27/40; B32B 27/281
See application file for complete search history.

(56) References Cited

U.S. PATENT DOCUMENTS

| | | | | |
|---|---|---|---|---|
| 2006/0065534 | A1* | 3/2006 | Nakai | C25D 5/02 205/118 |
| 2007/0299164 | A1* | 12/2007 | Hayashi | H01B 3/12 523/457 |
| 2010/0286311 | A1* | 11/2010 | Meyer | B82Y 30/00 523/466 |
| 2011/0001251 | A1 | 1/2011 | Gou et al. | |
| 2011/0274922 | A1* | 11/2011 | Yasue | B32B 7/12 428/354 |
| 2012/0252930 | A1* | 10/2012 | Kobayashi | C08F 283/10 523/400 |
| 2013/0043058 | A1* | 2/2013 | Shanai | C09J 177/06 174/126.4 |
| 2013/0162063 | A1* | 6/2013 | Sasajima | H02K 1/2766 310/43 |
| 2013/0338329 | A1* | 12/2013 | Imada | C07C 69/54 526/323.1 |
| 2014/0158398 | A1* | 6/2014 | Shanai | H01B 3/421 174/117 F |
| 2015/0037575 | A1* | 2/2015 | Sakaguchi | H01L 23/49551 428/354 |
| 2016/0137818 | A1* | 5/2016 | Kuczynski | C08K 9/00 523/218 |
| 2017/0038510 | A1* | 2/2017 | Sudeji | B29D 11/0073 |
| 2017/0307952 | A1* | 10/2017 | Ash | C08G 18/73 |

FOREIGN PATENT DOCUMENTS

| | | | |
|---|---|---|---|
| JP | 2006-104344 A | 4/2006 | |
| JP | 2006-286389 A | 10/2006 | |
| JP | 2008-019375 A | 1/2008 | |
| JP | 2010-084005 A | 4/2010 | |
| JP | 2014-074172 A | 4/2014 | |
| JP | 2014-129544 A | 7/2014 | |
| WO | WO-2015098956 A1 * | 7/2015 | ......... B29D 11/0073 |

OTHER PUBLICATIONS

Aditya Birla Chemicals, Epoxy phenol novolac resins. Retrieved on Aug. 22, 2019. (Year: 2019).*

Vylon, 2010 https://pdf4pro.com/fullscreen/vylon-13a482.html (Year: 2010).*

Japanese Office Action, dated Aug. 6, 2020, in Japanese Application No. 2016-255344 and English Translation thereof.

* cited by examiner

ADHESIVE FILM AND A FLAT WIRING MEMBER USING THE SAME

The present application is based on Japanese patent application Nos. 2016-075241 and 2016-255344 filed on Apr. 4, 2016 and Dec. 28, 2016, respectively, the entire contents of which are incorporated herein by reference.

BACKGROUND OF THE INVENTION

1. Field of the Invention

The invention relates to an adhesive film wire and a flat wiring member using the same.

2. Description of the Related Art

Flat wiring members, typically represented by a flat cable, a flexible flat cable, and MFJ (Multi Frame Joiner) have been widely used as wiring materials for electric devices, electronic devices or automobiles, because of their features of being thin and light.

A flat cable is typically manufactured by e.g. by aligning plural straight rectangular cross section conductors to be sandwiched between two adhesive films and continuously heating and pressing the two adhesive films sandwiching the plural conductors together with using one or more heated rolls.

An adhesive film to be used as a component of the flat cable comprises e.g. a resin film as a base material and an adhesive layer formed on the resin film.

The flat cable is connected to a device via a connector configured to fit to a terminal portion in many cases. At the time of connection, a pressure is regularly applied from the connector to the terminal portion. In this state, in a terminal portion, if the flat cable is installed in a high temperature environment which is higher than a softening temperature (apparent initial softening) of adhesive constituting the adhesive layer, the adhesive will flow due to the pressure received from the connector, so that the adhesive layer may become thin or a conductor of the terminal portion may float. As a result, a contact between the connector and the terminal portion may become unstable and affect the operation of the device.

As a method for providing a flat cable with heat resistance for use in the high temperature environment, e.g. a method of using an adhesive layer including a specific crystalline polyester resin and a specific organic solvent is disclosed (cf. JP-A 2014-74172).

Also, a method of fusion-bonding a film mainly composed of polycarbonate directly to the conductors without the intervention of any adhesive layer (cf. JP-A 2006-286389).

SUMMARY OF THE INVENTION

In accordance with high-density implementation of electric devices and electronic devices as well as the application expansion for the automotive wiring materials, the flat wiring members, typically represented by the flat cable, are demanded to be usable in the high temperature environment which is higher than the conventional flat wiring members. For example, a flat wiring member may be used in high temperature environment of around 150° C. when it is used in an engine room of the automobile.

When used in the further high temperature environment as mentioned above, the flat cable using the crystalline polyester resin as the adhesive as described in JP-A 2014-74172 has a disadvantage in that the environmental temperature may exceed a melting point or a softening temperature such as glass transition temperature of the adhesive, so that the fluidity of the adhesive will become extremely high. Therefore, such a flat cable is unsuitable for the use in such a high temperature environment.

Also, the method for providing the heat resistance by selecting a resin having a high crystal melting point and a high glass transition temperature is unfavorable because the workability by the heated roll may be spoiled and the productivity may be deteriorated when a resin having a crystal melting point and a glass transition temperature that are extremely higher than a service condition.

Therefore, it is an object of the present invention to provide an adhesive film comprising an adhesive layer which is hard to flow in the condition where it receives a pressure from a connector in a high temperature environment when a flat wiring member is used in the high temperature environment, and to provide a flat wiring member using the adhesive film.

According to the present invention, the Inventors firstly focused on a technique of crosslinking the adhesive as a method for controlling the fluidity of the adhesive layer when used in a high temperature environment (e.g., environment of around 150° C.), other than the methods as described above. Further, the Inventors found that when an adhesive layer used in a flat wiring member manufactured by this method is evaluated by a softening temperature test using the thermomechanical analysis (TMA), a detection stick (probe) of a TMA apparatus does not penetrate through the adhesive layer even after having exceeded the softening temperature. Note that, in the present invention, as a method for evaluating the flow resistance of the adhesive layer of the adhesive film in the high temperature environment, the softening temperature test method using the thermomechanical analysis (TMA) may be preferably used for easily evaluating the flow resistance. Also, as a method for measuring the softening temperature of the adhesive film, JIS K7196 "Testing method for softening temperature of thermoplastic film and sheeting by thermomechanical analysis" according to Japanese Industrial Standards may be used.

The present invention provides an adhesive film and a flat wiring member to achieve the above object.

[1] An embodiment of the invention provides an adhesive film, comprising:
 a resin film; and
 an adhesive layer provided on the resin film,
 wherein the adhesive layer comprises a resin composition including 2 parts by mass or more of an epoxy resin including two or more epoxy groups in molecules and having epoxy equivalents of 300 g/eq or less, per 100 parts by mass of an amorphous resin, which is soluble to a solvent and has a plurality of carboxyl groups in molecules, and which has a glass transition temperature of 100° C. or less and an acid value of 5 KOHmg/g or more.

[2] In the adhesive film according to [1], the adhesive layer includes 0.3 parts by mass or more and 10 parts by mass or less of a filler (A) having a specific surface area ($m^2/g$) of 90 or more by BET method, per 100 parts by mass of the amorphous resin.

[3] In the adhesive film according to [1] or [2], the adhesive layer includes 5 parts by mass or more and 150 parts by mass or less of a filler (B) having an average particle diameter (median diameter) of 1 μm or more and 10 μm or less by laser diffraction method, per 100 parts by mass of the amorphous resin.

[4] In the adhesive film according to any one of [1] to [3], the amorphous resin is selected from the group consisting of a saturated polyester resin and a polyester polyurethane resin.

[5] In the adhesive film according to any one of [1] to [4], the resin film comprises a polyimide film.

[6] In the adhesive film according to any one of [1] to [5], the resin composition further includes a flame retardant and a specific gravity of the flame retardant is 1.5 or less.

[7] In the adhesive film according to [6], each of the amorphous resin and the epoxy resin comprises a transparent material and the flame retardant comprises aluminum diethyl phosphinate.

[8] Another embodiment of the present invention provides a flat wiring member comprising:
 a conductor; and
 an adhesive film provided to sandwich the conductor, the adhesive film comprising a resin film and the adhesive layer provided on the resin film,
 wherein the adhesive layer has a crosslinked structure formed by reactions between a carboxyl group of an amorphous resin and an epoxy group of an epoxy resin,
 wherein a ratio of an intrusion of a detection stick with respect to a thickness of the adhesive layer at a temperature of 200° C., in a TMA curve (wherein a diameter of an indenter at a tip of the detection stick is 0.5 mm, a load is 0.5N, and a temperature increasing rate is 5° C./m) provided by JIS K7196, is not more than 50%.

[9] In the flat wiring member according to [8], the adhesive layer comprises a resin composition including 2 parts by mass or more of the epoxy resin including two or more epoxy groups in molecules and having epoxy equivalents of 300 g/eq or less, per 100 parts by mass of the amorphous resin, which is soluble to a solvent and has a plurality of carboxyl groups in molecules, and which has a glass transition temperature of 100° C. or less and an acid value of 5 KOHmg/g or more.

Effects of the Invention

According to the present invention, it is possible to provide an adhesive film comprising an adhesive layer which is hard to flow in the condition where it receives a pressure from a connector in a high temperature environment when a flat wiring member is used in the high temperature environment, and to provide a flat wiring member using the adhesive film.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment of the Invention

[Adhesive Film]

Figure 1:
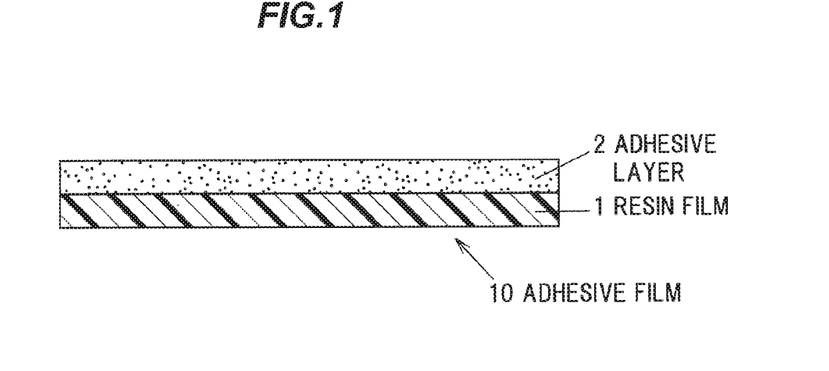
FIG. 1 is a cross sectional view showing an example of an adhesive film in an embodiment according to the present invention.

FIG. 1 is a cross sectional view showing an example of an adhesive film in an embodiment according to the present invention. Next, one embodiment of the present invention will be described below in conjunction with appended drawings.

Referring to FIG. 1, an adhesive film 10 in one embodiment according to the present invention comprises a resin film 1, and an adhesive layer 2 provided on the resin film 1, and the adhesive layer 2 comprises a resin composition including 2 parts by mass or more and 30 parts by mass or less of epoxy resin including two or more epoxy groups in molecules and having epoxy equivalents of 300 g/eq or less, per 100 parts by mass of amorphous resin, which is soluble to a solvent and has a plurality of carboxyl groups in molecules, and which has a glass transition temperature of 100° C. or less and an acid value of 5 KOHmg/g or more.

Particularly, since the amorphous resin has the acid value of 5 KOHmg/g or more and the epoxy resin includes two or more epoxy groups in molecules and has the epoxy equivalents of 300 g/eq or less, it is possible to provide the adhesive layer 2 which is hard to flow even if the flat wiring member is exposed to a high temperature environment of around 150° C. when it is used in the engine room of the automobile.

(Resin film 1)

As the resin film 1 to be used for a base material of the adhesive film 10, various kinds of films are available, but it is particularly preferable to use a polyimide film which is excellent in heat resistant property and flame retardant property.

As the typical polyimide films, brand name "Kapton" (registered trademark) made by Du Pont-Toray, brand name "UPILEX" (registered trademark) made by Ube Industries, and brand name "Apical" (registered trademark) by Kaneka Corp. may be used. Of these polyimide films, "Kapton" (registered trademark) is preferable since it has a balanced strength and elongation.

In the environment that the temperature of the service condition exceeds 150° C. consecutively, it is necessary to use a resin film having a high durability in the high temperature environment such as polyimide films. However, when the heat resistance to this extent is not required, it is possible to use the resin films except expensive polyimide, e.g., a polyethylene terephthalate (PET) film, a polyethylene naphthalate (PEN) film, and a polyphenylene sulfide (PPS) film may be applied for suppressing the cost.

The thickness of the resin film 1 is preferably 9 μm to 100 μm, and more preferably 12 μm to 50 μm. When the thickness of the resin film 1 is 9 μm or more, the strength and the withstand pressure will be sufficient. When the 100 μm thickness of the resin film 1 does not exceed 100 μm, the flexibility as the flat cable can be securely provided.

(Adhesive layer 2)

(1) Amorphous Resin

The resin composition to be used for forming the adhesive layer 2 includes an amorphous resin, which is soluble to a solvent and has a plurality of carboxyl groups in molecules, and which has a glass transition temperature of 100° C. or less and an acid value of 5 KOHmg/g or more.

The formation of the adhesive layer 2 on the resin film 1 is performed by wet coating which can be processed continuously at a high-speed. Therefore, the base resin is required to be soluble to a solvent.

As a solvent, it is particularly preferable to use a general-purpose solvent having a boiling point of around 75 to 120° C., e.g. methyl ethyl ketone or toluene. When a solvent having a boiling point not lower than 75° C. is used, the work environment will not be deteriorated because a vaporized quantity of the solvent is adequate even at the room temperature. Also, when a solvent having a boiling point not higher than 120° C. is used, a drying temperature will not be too high, so that there will be no concern about that hydrolysis may advance during drying or the adhesive film curls after drying.

The amorphous resin includes a plurality of carboxyl groups in molecules. The plurality of carboxyl groups form a crosslinked structure with a plurality of epoxy groups in the epoxy resin to be described below. It is preferable that the number of carboxyl groups would be 3 or more in 1 molecule of the amorphous resin.

Also, the flat wiring member is typically molded by continuous laminating using the heated roll, and the processing temperature is higher than a glass transition temperature of the base resin. Therefore, the long lifetime of a laminate roll may be spoiled depending on a material of the laminate roll when the glass transition temperature exceeds 100° C. Therefore, it is preferable to use an amorphous resin having a glass transition temperature not higher than 100° C.

Also, the amorphous resin preferably has a molecular weight of 10,000 or more. It is possible to maintain the shape of the adhesive layer more easily when the molecular weight falls within the above range.

Furthermore, as the amorphous resin, it is preferable to use an amorphous resin having an acid value of 5 KOHmg/g or more, and more preferably an amorphous resin having an acid value of 10 KOHmg/g or more.

As the amorphous resin meeting the above condition, it is possible to use e.g. polyester resin and polyurethane resin, and it is preferable to use saturated polyester resin, polyester polyurethane resin and the like. These resins may be used alone or together.

As the saturated polyester resins, e.g. "Vylon" (registered trademark) series made by Toyobo, "Elitel" (registered trademark) series made by Unitika, "Nichigo-Polyester" (registered trademark) made by Nippon Synthetic Chemical Industry, "Espel" (registered trademark) 9940 series made by Hitachi Chemical or the like may be used.

As the polyester polyurethane resin, e.g. "Vylon" (registered trademark) UR series made by Toyobo may be used.

(2) Epoxy Resin

The resin composition to be used for forming the adhesive layer 2 includes 2 parts by mass or more of the epoxy resin including two or more epoxy groups in molecules and having epoxy equivalents of 300 g/eq or less per 100 parts by mass of the amorphous resin. If the epoxy resin is less than 2 parts by mass, the degree of crosslinking is insufficient. When the epoxy resin is more than 30 parts by mass, the excessive addition does not contribute to hardening, although it depends on an acid equivalent of the amorphous resin and an epoxy equivalent of the epoxy resin. Therefore, the resin composition preferably includes 2 parts by mass or more and 30 parts by mass or less of the epoxy resin, and more preferably 3 parts by mass or more and 30 parts by mass or less of the epoxy resin.

As a form of the epoxy resin including two or more epoxy groups in molecules, e.g. trifunctional type, phenol novolac type, ortho-cresol novolac type, glycidyl amine type, paraaminophenol type, trisphenol methane type, tetraphenyl ethane type, dicyclopentadiene type, or tetrafunctional naphthalene type may be listed.

The epoxy equivalent (g/eq) of the epoxy resin should be 300 g/eq or less, preferably 260 g/eq or less, and more preferably 220 g/eq or less.

As an example of the epoxy resins meeting the above condition, multifunctional type epoxy resins (grade: 152, 154, 157S70, 1031S, 1032H60, 604, 630, etc.) made by Mitsubishi Chemical Corp. may be used. Note that "multifunctional type epoxy resin" means an epoxy resin having 3 or more epoxy groups in molecules.

(3) Filler (A)

The resin composition to be used for forming adhesive layer 2 may include 0.3 parts by mass or more and 10 parts by mass or less of a filler (A) having a specific surface area ($m^2/g$) of 90 or more by BET method, per 100 parts by mass of the amorphous resin, as necessary. The viscosity of the resin composition may be raised by adding the filler (A) having the specific surface area ($m^2/g$) of 90 or more by the BET method to a varnish. If the filler (A) is less than 0.3 parts by mass per 100 parts by mass of the amorphous resin, an effect of raising the viscosity of the resin composition will not be achieved, and a stable application of the resin composition may not be performed particularly when the adhesive layer 2 is made thick. If the filler (A) is more than 10 parts by mass per 100 parts by mass of the amorphous resin, the viscosity of the resin composition will rise remarkably, so that the workability rather may worsen.

As an example of the filler (A) satisfying the above requirement, "AEROSIL" (registered trademark) series made by EVONIK which is synthetic silica, "HDK" (registered trademark) series made by Wacker Asahikasei Silicone Co., Ltd. may be used.

(4) Filler (B)

Furthermore, the resin composition to be used for forming adhesive layer 2 may include 5 parts by mass or more and 150 parts by mass or less of a filler (B) having an average particle diameter (median diameter) of 1 μm or more and 10 μm or less by laser diffraction method, per 100 parts by mass of the amorphous resin, as necessary.

When the filler (B) is included in the adhesive layer 2 of the adhesive film 10, the handling property of the adhesive film 10 will improve because the sliding property of a surface of the adhesive layer 2 is excellent and the air is hard to be introduced at the time of rewinding of the adhesive film 10 when the adhesive film 10 is formed. When the filler (B) is not added, a film may be provided as a separator on the surface of the adhesive layer 2 of the adhesive film 10 to securely providing the sliding property of the surface of the adhesive layer 2.

When a non-inflammable polyimide film is used for the resin film 1, it is not necessary to provide the adhesive layer 2 with the flame retardant property, but when the resin film except polyimide is applied, it is necessary to provide the adhesive layer 2 with the flame retardant property. In other words, a flame retardant may be added as the filler (B) to provide the adhesive film 10 with flame retardant property.

In the case of using the flame retardant, high flame retardant property can be provided by a low additive amount with the use of chlorine-based flame retardant, bromine-based flame retardant, antimony trioxide, metal hydroxide, melamine cyanurate, or phosphorus-based flame retardant as a simple substance or a combination thereof.

The flame retardant in an adhesive varnish to be used for forming an adhesive layer tends to sediment during the storage of the adhesive varnish at a step before the application of the adhesive varnish to the resin film. Therefore, it is expected that the sedimentation of the flame retardant is slow at the time of storing the adhesive varnish and the adhesive varnish has a long pot life. For achieving the above function, it is desirable to select the flame retardant which has a specific gravity close to a specific gravity of the amorphous resin which is used as a base resin. When saturated polyester resin or polyester polyurethane resin is used as the amorphous resin, the specific gravity of the flame retardant is preferably 1.0 or more and 1.5 or less so as not to sediment in the adhesive varnish in view of the specific gravity of the saturated polyester resin and polyester polyurethane resin being around 1.1 to 1.3.

Further, if the particle diameter of the fire retardant is large, mechanical characteristics of the adhesive film and a wiring component using the adhesive film might be spoiled. Therefore it is desirable to use the flame retardant having an average particle diameter (d50) of 5 μm or less by the particle size distribution measurement by the laser diffraction-dispersion method. As an example of such a flame retardant, "Exolit OP900" series made by Clariant may be used.

Still further, if a large quantity of the flame retardant is added to provide a high flame retardant property, the transparency of the adhesive film might be lost by concealment property of the flame retardant. It is desirable that the adhesive film has the transparency from a point of view that the abnormality within the wiring component can be observed from the outside of the wiring component. It is therefore desirable to use the amorphous resin and the epoxy resin with high transparency and it is also desirable to use the flame retardant with high transparency. As an example of such a flame retardant, aluminum diethyl phosphinate may be used. The "transparency" used herein includes a semi-transparent substance as long as the abnormality within the wiring component can be observed from the outside of the wire component.

(5) Thickness

The thickness of the adhesive layer 2 to be formed on the resin film 1 may vary depending on the thickness of the conductor 3 to be used, but preferably 12 μm-75 μm, and more preferably 18 μm-50 μm. When the thickness of the adhesive layer 2 is not less than 12 μm, a space surrounding the conductor 3 can be buried without any gap at the time of manufacturing the flat cable. When the thickness of the adhesive layer 2 is not more than 75 μm, the adhesive will not run over at the time of laminating. Further, the wet coating property will be excellent.

(Manufacturing Method)

The adhesive film 10 is made by forming the adhesive layer 2 by the wet coating on one side of the resin film 1 as a base film. Specifically, the manufacturing method of the adhesive film 10 will be described as follows.

(1) The above-mentioned amorphous resin is dissolved in a solvent and the above-mentioned epoxy resin is added thereto to provide an adhesive varnish. A filler (A), a filler (B), a flame retardant, an antioxidant, a coloring agent, a copper inhibitor, a leveling agent and the like are added to the adhesive varnish as needed.

(2) This adhesive varnish is applied on a resin film 1 and dried to form an adhesive layer 2 on the resin film 1, thereby manufactures an adhesive film 10. Note that when the adhesive film 10 is heated, a carboxyl group reacts with an epoxy group, so that a crosslinked structure is formed.

(Effect of the Embodiment of the Present Invention)

In the adhesive film 10 in the embodiment according to the present invention, the carboxyl group and the epoxy group react by heating, so that the crosslinked structure is formed. According to this crosslinked structure, the adhesive layer becomes hard to flow even though the pressure is received from the connector in the high temperature environment.

Further, in the adhesive film 10 in the embodiment according to the present invention, since the reaction between the carboxyl group and the epoxy group does not advance in the room temperature environment, it is possible to save the adhesive film for a long term (e.g., around one month). That is, a storage stability of the adhesive film will not be short.

Still further, the adhesive film 10 in the embodiment according to the present invention can be stored for a long term (e.g., around six months) by refrigerating.

Furthermore, in the embodiment according to the present invention, because the resin which can dissolve to an all-purpose organic solvent is adopted, unlike a case of crosslinking polyolefin resin by electron beam irradiation, it is possible to manufacture the adhesive film 10 at the high speed by the wet coating, so that the productivity is very high.

In addition, it is possible to provide the adhesive film 10 with the flame retardant property by adding the flame retardant to the adhesive layer 2.

It is possible to slow down the sedimentation during the safekeeping of the adhesive varnish at the step before the application of the adhesive varnish to the resin film, thereby prolong the pot life of the adhesive varnish, by using the flame retardant having a specific gravity of 1.5 or less.

It is possible to securely provide the adhesive film with the transparency by using the transparent amorphous resin and the transparent epoxy resin as well as using the aluminum diethyl phosphinate as a flame retardant, so that the abnormality within the wiring component can be observed from the outside of the wire component.

The adhesive film 10 in the embodiment according to the present invention may be applied to e.g. a flat wiring member such as flat cable, MFJ (Multi Frame Joiner), and the like.

[Flat Wiring Member]

Figure 2:
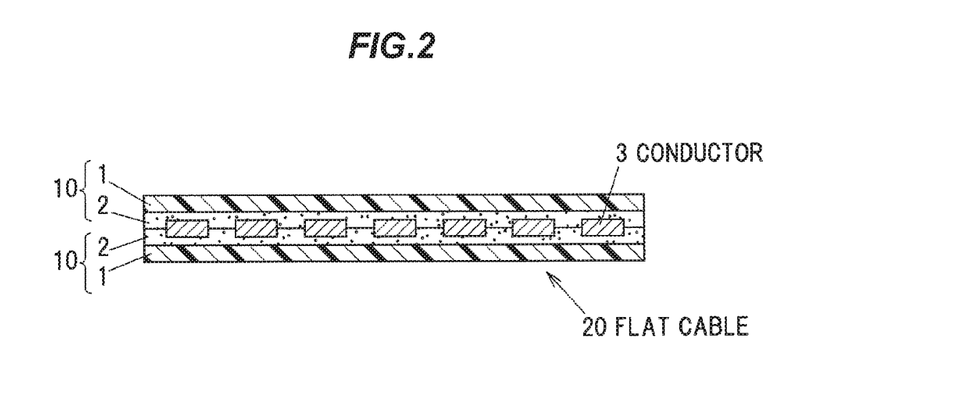
FIG. 2 is a cross sectional view showing an example of a flat cable in an embodiment according to the present invention.
Figure 5:
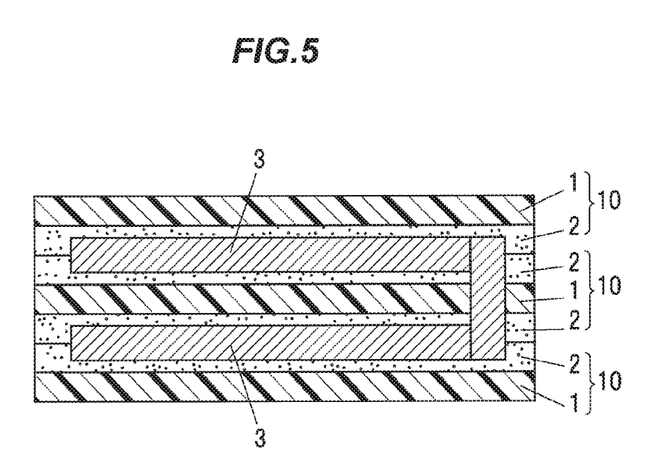
FIG. 5 is a cross sectional view showing an example of MFJ in an embodiment according to the present invention.

FIG. 2 is a cross sectional view showing an example of a flat cable in an embodiment according to the present invention. FIG. 5 is a cross sectional view showing an example of MFJ in an embodiment according to the present invention.

Referring to FIG. 2, a flat cable 20 in the embodiment according to the present invention comprises a conductor 3 and the adhesive films 10 in the embodiment according to the present invention which sandwiches the conductor 3 therebetween. The adhesive film 10 comprises the resin film 1 and the adhesive layer 2 provided on the resin film 1 as described above.

The adhesive layer 2 has the crosslinked structure formed by reactions between the carboxyl group of the amorphous resin and the epoxy group of the epoxy resin, in which a ratio of an intrusion of a detection stick with respect to a thickness of the adhesive layer 2 at a temperature of 200° C., in a TMA curve (wherein a diameter of an indenter at a tip of the detection stick is 0.5 mm, load is 0.5N, and a temperature increasing rate is 5° C./m) provided by JIS K7196, is not more than 50%. The ratio of the intrusion of the detection stick is preferably not more than 40%, more preferably not more than 30%, most preferably not more than 25%.

Note that, in the present embodiment, the adhesive film 10 in the embodiment according to the present invention is used for the adhesive film 10. However, the present invention is not limited thereto as long as the adhesive layer 2 has the above crosslinked structure, and the ratio of the intrusion of the detection stick in the above condition is not more than 50%.

The crosslinked structure of the adhesive layer 2 is formed by the reaction between the carboxyl group and the epoxy group by the heating step in the manufacturing process of the flat cable 20 and the MFJ.

As materials of the conductor 3, copper, soft copper, silver, aluminum, and the like may be used. Further, tinning (Sn-plating), nickel plating, silver plating, gilding (Au-plating) may be provided on the surface of the conductor 3 to improve the heat resistance. Also, the conductor 3 may have various kinds of cross-sections such as a flat shape, circular shape, but a rectangular conductor adopted in the embodiment shown in FIG. 2 is preferred.

The flat cable 20 can be formed by sandwiching a plurality of conductors 3 arranged in parallel with each other between the adhesive layers 2 of two adhesive films 10 and integrating the two adhesive films 10 and the plurality of conductors 3 by laminating. The MFJ can be formed by preparing an adhesive film 10 comprising a resin film 1 and adhesive layers 2 on both side of the resin film 1, arranging conductors 3 on both the adhesive layers 2 respectively, and locating the conductors 3 between two other adhesive films 10 including a resin film 1 and an adhesive layer 2 such that the conductors 3 are sandwiched by the adhesive layers 2, integrating the conductors 3 and the adhesive films 10 by laminating, and electrically connecting between the conductors 3.

The flat cable in the embodiment according to the present invention is explained to use a plurality of conductors 3. The number of conductors is not limited and the conductor 3 may be a single wire.

Examples

Next, the present invention will be described below based on Examples in more detail, however, the present invention is not limited thereto.

(1) Preparation of the Adhesive Varnish

In Examples 1 to 4 and Comparative examples 1 to 4, 100 parts by mass of a base resin (amorphous resin) described in Tables 1 and 2 was dissolved to 150 parts by mass of a solvent. Then respective components as described in Tables 1 and 2 were added by predetermined compositions, and when the viscosity was too high, the solvent was added to prepare an adhesive varnish. However, in Examples 2 to 4, a filler (A) and a filler (B) were not added to the adhesive varnish to be used for manufacturing an adhesive film for TMA durability evaluation as described below in (3).

In Examples 5 to 9 and Comparative examples 5 and 6, 100 parts by mass of a base resin (amorphous resin) described in Tables 3 and 4 were dissolved to 300 parts by mass of the solvent. Then respective components as described in Tables 3 and 4 were added by predetermined compositions, and when the viscosity was too high, the solvent was added to prepare an adhesive varnish.

For the solvent, methyl ethyl ketone and toluene were used alone or mixed at a predetermined ratio.

(2) Manufacture of the Adhesive Film

The adhesive varnish prepared by the process described in (1) was dropped on a resin film and applied thereto using an applicator having a predetermined gap. With the use of a hot air oven, the adhesive varnish was dried at a temperature of 100 to 130° C. for ten minutes to form an adhesive layer, thereby providing an adhesive film. The drying temperature was selected according to a ratio of methyl ethyl ketone and toluene.

(3) Softening Behavior Evaluation of the Adhesive Layer by the TMA (the TMA Durability)

The adhesive film made by the process described in (2) was crosslinked by heating at a temperature of 145° C. with the hot air oven for 180 minutes, to manufacture an adhesive film for TMA durability evaluation. In Examples 5 to 7 and Comparative examples and Comparative examples 5 and 6, the adhesive film was crosslinked by heating at a temperature of 120° C. with the hot air oven for 8 hours. As a method for measuring the softening temperature of the adhesive film, Japanese Industrial Standards define JIS K7196 "Testing method for softening temperature of thermoplastic film and sheeting by thermomechanical analysis". According to JIS K7196, the adhesive film was evaluated.

Figure 3:
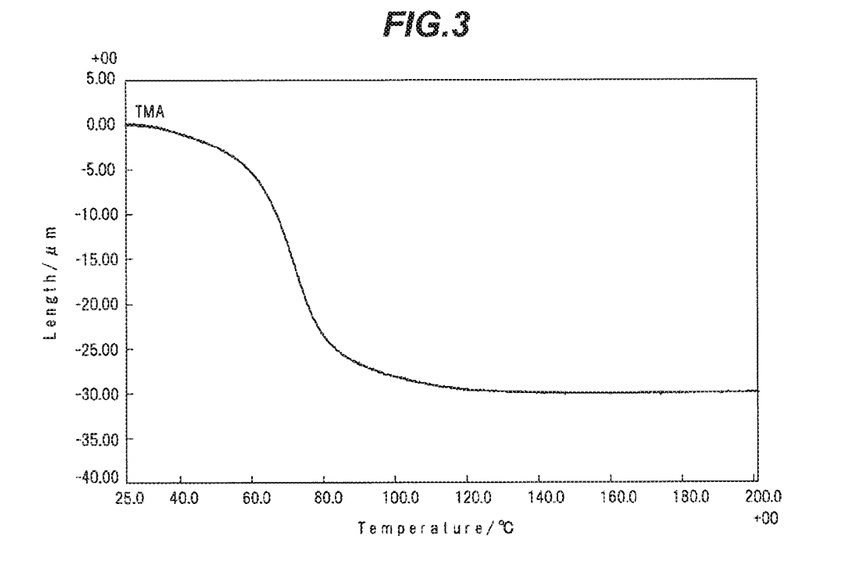
FIG. 3 is a graph showing a TMA curve of an adhesive film including a non-crosslinked adhesive layer having a thickness of 30 μm.
Figure 4:
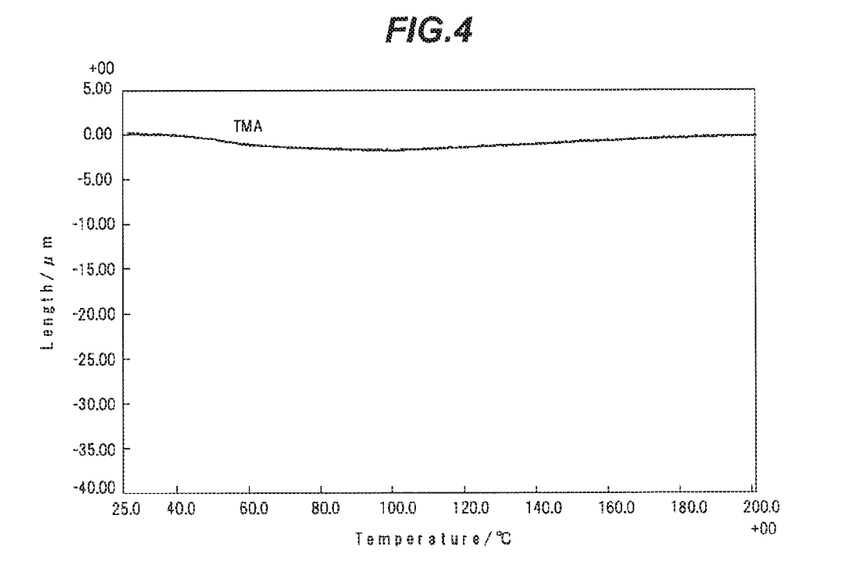
FIG. 4 is a graph showing a TMA curve of an adhesive film including a crosslinked adhesive layer having a thickness of 30 μm.

Note that, in the measurement examples of the TMA durability as shown in FIGS. 3 and 4 to be described below, the resin composition comprising only the base resin and the epoxy resin without adding the filler (A) and the filler (B) was used for the adhesive layer of the adhesive film, similarly to Examples 2 to 4. The TMA durability can be evaluated with the samples including the filler (A) or the filler (B) in the resin composition. However, it was thought that the detection stick (probe) might hardly intrude to the resin composition due to the existence of the filler (A) or the filler (B). Therefore, it was decided to evaluate the TMA durability with the samples including no filler, i.e. the samples in the most severe condition (i.e. the condition that the probe may intrude most easily). If the quantity of intrusion of the probe is 50% or less in these samples, the quantity of intrusion of the probe will be 50% or less even though the samples include the filler (A) or the filler (B).

The "Thermo EVO II" made by Rigaku was used as a measuring apparatus, and a TMA curve in which a horizontal axis indicates the temperature, and a vertical axis indicates the volume of deformation at penetration mode was used for evaluation. The diameter of an indenter of the tip of the detection stick (probe) was 0.5 mm, the load was 0.5N, and the temperature rising rate was 5° C./m. The measurement temperature was within the range from the room temperature to 200° C.

In the measurement of the adhesive film in which the adhesive layer was not crosslinked, when the temperature exceeded the glass transition temperature of the amorphous resin, the softening of the adhesive layer suddenly advanced such that the probe intruded for the thickness of the adhesive and penetrated through the adhesive layer. The measurement example is shown in FIG. 3.

FIG. 3 is a graph showing a TMA curve of an adhesive film including a non-crosslinked adhesive layer having a thickness of 30 μm. The vertical axis indicates the quantity of intrusion (μm) of the probe and the horizontal axis indicates the temperature (° C.). It is confirmed that the softening advances when the temperature exceeded 60° C., and the quantity of intrusion reached 30 μm and penetrated through the adhesive layer at the temperature of around 130° C.

In the measurement of the adhesive film in which the adhesive layer was crosslinked, even when the temperature exceeded the glass transition temperature of the amorphous resin and the adhesive layer was softened, the probe did not intrude for the thickness of the adhesive and did not penetrate through the adhesive layer. The measurement example is shown in FIG. 4.

FIG. 4 is a graph showing a TMA curve of an adhesive film including a crosslinked adhesive layer having a thickness of 30 μm. A vertical axis and a horizontal axis are the same as FIG. 3. The vertical axis indicates the quantity of intrusion (μm) of the probe and the horizontal axis indicates the temperature (° C.), similarly to FIG. 3. At maximum, the probe intruded into the adhesive layer for approximately 2 μm, but it is found that the quantity of intrusion hardly changes even though the temperature rises. This is because the base resin of the adhesive layer became hard to flow by crosslinking.

A ratio of the intrusion of the probe measured up to 200° C. by the TMA with respect to the thickness of the adhesive layer of the crosslinked adhesive film was evaluated as the TMA durability. At the temperature of 200° C., when the ratio of the intrusion of the probe is 50% or less, the sample is evaluated as ○ (passed), and when the ratio of the intrusion of the probe exceeds 50%, the sample is evaluated as x (failure). The evaluation result is shown in Table 1 and Table 2.

(4) Storage Stability Evaluation of the Varnish

In Examples 5 to 9 and Comparative examples 5 and 6, after the flame retardant was dispersed in the adhesive varnish, the adhesive varnish was enclosed in a glass container and left in still-standing at the room temperature for 8 hours. Then, the sedimentation of the flame retardant was evaluated. When the remarkable sedimentation of the flame retardant is not observed, the sample is evaluated as ○ (passed), and when the remarkable sedimentation of the flame retardant is observed, the sample is evaluated as x (failure).

(5) Evaluation of the Transparency

In Examples 5 to 9 and Comparative examples 5 and 6, the luminous transmittance of the adhesive film manufactured as described above was evaluated. When the luminous transmittance is 30% or more, the sample is evaluated as ○ (passed), and when the luminous transmittance is less than 30%, the sample is evaluated as x (failure).

(6) Evaluation of the Flame Retardant Property

In Examples 5 to 9 and Comparative examples 5 and 6, the flame retardant property was evaluated according to UL94VTM. When the result meets VTM-2, the sample is evaluated as ○ (passed), and when the result does not meet VTM-2, the sample is evaluated as x (failure).

(7) Preparation of the Conductor

On a surface of a conductor (copper) having a rectangular cross section with a thickness of 35 μm and a width of 300 μm, a Ni film with a thickness of 0.1 μm was formed by electroplating. The conductor coated with Ni-plating was cleaned by UV ozonosphere treatment for 5 minutes.

(8) Manufacture of an Initial Sample and a Heat Resistance Evaluation Sample

A plurality of conductors formed by the process described in (7) were arranged on the adhesive layer of the adhesive film formed by the process described in (2) and bonded by pressurization under conditions of 160° C., 1 MPa for 30 seconds to be adhered with the adhesive film. Further, with a hot air oven, the adhesive film was crosslinked by heating at 145° C. for 180 minutes to manufacture an initial sample. Also, a heat aging was performed on the initial sample at 180° C. for 400 hours to provide a heat resistance evaluation sample.

(9) Evaluation of an Initial Bonding Strength and a Heat-Resistant Bonding Strength The bonding strength between the conductor of the sample made by the process described in (8) and the adhesive film was evaluated by 180 degrees peel test. The measurement was performed at an elastic stress rate of 50 mm/m at 23° C. in the environment of RH50%. When the bonding strength of the initial sample is 0.7 N/mm or more, the sample is evaluated as ○ (passed), and when the bonding strength of the initial sample is less than 0.7 N/mm, the sample is evaluated as x (failure). In Examples 1 to 4 and Comparative examples 1 to 4, the heat-resistant bonding strength was evaluated. When the bonding strength of the heat-resistance evaluation sample is 0.5 N/mm or more, the sample is evaluated as ○ (passed), and when the bonding strength of the heat-resistance evaluation sample is less than 0.5 N/mm, the sample is evaluated as x (failure). The evaluation result is shown in Table 1 and Table 2.

(Used Materials)

<Base Resin (Amorphous Resin)>

Vylon (registered trademark) GK150 (made by Toyobo) [Solubility to solvent, Glass transition temperature: 20° C., Molecular weight: 13,000, Acid value: 5 KOHmg/g]

Vylon (registered trademark) UR3500 (made by Toyobo) [Solubility to solvent, Glass transition temperature: 10° C., Molecular weight: 40,000, Acid value: 35 KOHmg/g]

Vylon (registered trademark) 500 (made by Toyobo) [Solubility to solvent, Glass transition temperature: 4° C., Molecular weight: 23,000, Acid value: less than 2 KOHmg/g]

Vylon (registered trademark) GK890 (made by Toyobo) [Solubility to solvent, Glass transition temperature: 17° C., Molecular weight: 11,000, Acid value: 5 KOHmg/g]

<Epoxy Resin>

1032H60 (multifunctional type) (made by Mitsubishi Chemical Corp.) [Trisphenol methane type epoxy resin, epoxy equivalent: 163-175 g/eq]

1031S (multifunctional type) (made by Mitsubishi Chemical Corp.) [Tetraphenyl ethane type epoxy resin, epoxy equivalent: 180-220 g/eq]

154 (multifunctional type) (made by Mitsubishi Chemical Corp.) [Phenol novolac type epoxy resin, epoxy equivalent: 176-180 g/eq]

1001 (bifunctional type) (made by Mitsubishi Chemical Corp.) [Bisphenol A type epoxy resin, epoxy equivalent: 450-500 g/eq]

Here, the "bifunctional type" means that the epoxy resin has two epoxy groups.

<Filler (A)>

AEROSIL (registered trademark) R972 (made by EVONIK) [BET specific surface area: 110 $m^2/g$], as hydrophobic fumed silica <Filler (B)>

Exolit OP930 (made by Clariant) [average particle diameter (d50): 3 μm, specific gravity: 1.35], as phosphor-based flame retardant Exolit OP935 (made by Clariant) [average particle diameter (d50): 3.5 μm, specific gravity: 1.35], as phosphor-based flame retardant SAYTEX8010 (made by ALBEMARLE) [average particle diameter: 5.6 μm, specific gravity: 3.25], as bromine-based flame retardant KISUMA5A (made by Kyowa Chemical Industry, Co., Ltd.) [average particle diameter: 0.94 μm, specific gravity: 2.3], as metal hydroxide-based flame retardant MC-2010N (made by Sakai Chemical Industry, Co., Ltd.) [average particle diameter: 3 μm, specific gravity: 1.7], as nitrogen-based flame retardant <Resin Film>

Kapton (registered trademark) 100V (made by Du Pont-Toray), as a polyimide film

Teonex (registered trademark) Q83 (made by Teijin Film Solutions, Ltd.), as a polyethylene naphthalate film Lumirror (registered trademark) S10 (made by Toray Industries, Inc.) as a polyethylene terephthalate film

TABLE 1

| | Items | | | Composition | | | |
|---|---|---|---|---|---|---|---|
| | | | | Example 1 | Example 2 | Example 3 | Example 4 |
| Blending of Adhesive layer (parts by mass) | Base resin (Amorphous resin) | Vylon GK150 (Toyobo) | Saturated polyester (Acid value: 5 KOHmg/g) | 100 | 100 | — | — |
| | | Vylon UR3500 (Toyobo) | Polyester urethane (Acid value: 35 KOHmg/g) | — | — | 100 | 100 |
| | Epoxy resin | 1032H60 (Mitsubishi Chemical Corp.) | Trisphenol methane type (multifunctional) | 2 | — | 3 | — |
| | | 1031S (Mitsubishi Chemical Corp.) | Tetraphenyl ethane type (multifunctional) | — | 30 | — | 25 |
| | Filler (A) | AEROSIL R972 | Fumed silica (Specific surface area: 110 m²/g) | — | 0.3 | 10 | 2 |
| | Filler (B) | SAYTEX8010 | Bromine-based flame retardant (average particle diameter: 5.6 μm) | — | — | — | 100 |
| Resin film | Polyimide film | Kapton 100V | Thickness: 25 μm | Applied | Applied | Applied | — |
| | Polyethylene Naphthalate | Teonex Q83 | Thickness: 25 μm | — | — | — | Applied |
| Characteristic Evaluation | TMA durability | | Intrusion ratio: 50% or less | ○ | ○ | ○ | ○ |
| | Initial bonding strength | | 0.7 N/mm or more | ○ | ○ | ○ | ○ |
| | Heat resistant bonding strength | | 0.5 N/mm or more | ○ | ○ | ○ | ○ |

TABLE 2

| | Items | | | Composition | | | |
|---|---|---|---|---|---|---|---|
| | | | | Comparative Example 1 | Comparative Example 2 | Comparative Example 3 | Comparative Example 4 |
| Blending of Adhesive layer (parts by mass) | Base resin (Amorphous resin) | Vylon GK890 (Toyobo) | Saturated polyester (Acid value: 5 KOHmg/g) | 100 | — | 100 | — |
| | | Vylon 500 (Toyobo) | Saturated polyester (Acid value: <2 KOHmg/g) | — | 100 | — | 100 |
| | Epoxy resin | 1001 (Mitsubishi Chemical Corp.) | Bisphenol A type (bifunctional) | — | — | 2 | — |
| | | 154 (Mitsubishi Chemical Corp.) | Phenol Novolac type (multifunctional) | — | — | — | 2 |
| Resin film | Polyimide film | Kapton 100V | Thickness: 25 μm | Applied | Applied | Applied | Applied |
| Characteristic Evaluation | TMA durability | | Intrusion ratio: 50% or less | x | x | x | x |
| | Initial bonding strength | | 0.7 N/mm or more | ○ | ○ | ○ | ○ |
| | Heat resistant bonding strength | | 0.5 N/mm or more | ○ | ○ | ○ | ○ |

TABLE 3

| | | | | Composition | | | | |
|---|---|---|---|---|---|---|---|---|
| | Items | | | Example 5 | Example 6 | Example 7 | Example 8 | Example 9 |
| Blending of Adhesive layer (parts by mass) | Base resin (Amorphous resin) | Vylon GK890 (Toyobo) | Saturated polyester (Acid value: 5 KOHmg/g) | 100 | — | 100 | — | 100 |
| | | Vylon UR3500 (Toyobo) | Polyester urethane (Acid value: 35 KOHmg/g) | — | 100 | — | 100 | — |
| | Epoxy resin | 154 (Mitsubishi Chemical Corp.) | Phenol Novolac type | 2 | — | 10 | — | — |
| | | 1031S (Mitsubishi Chemical Corp.) | Tetraphenyl ethane type | — | 25 | — | 25 | 10 |
| | Filler (B) | Exolit OP930 (Clariant) | Average particle diameter (d50): 3 μm, specific gravity: 1.35 | 50 | — | 150 | — | — |
| | | Exolit OP930 (Clariant) | Average particle diameter (d50): 3.5 μm, specific gravity: 1.35 | — | 100 | — | 100 | — |
| Resin film | PET | Lumirror S10 | Thickness: 25 μm | Applied | Applied | Applied | — | — |
| | Polyethylene Naphthalate | Teonex Q83 | Thickness: 25 μm | — | — | — | Applied | — |
| | Polyimide film | Kapton 100V | Thickness: 25 μm | — | — | — | — | Applied |
| Characteristic Evaluation | Varnish storage stability | | No sedimentation | ○ | ○ | ○ | ○ | ○ |
| | Initial bonding strength | | 0.7 N/mm or more | ○ | ○ | ○ | ○ | ○ |
| | Flame retardant property | | VTM-2 or more | ○ | ○ | ○ | ○ | ○ |
| | Transparency | | Luminous transmittance 30% or more | ○ | ○ | ○ | ○ | ○ |
| | TMA durability | | Intrusion ratio: 50% or less | ○ | ○ | ○ | ○ | ○ |

TABLE 4

| | | | | Composition | |
|---|---|---|---|---|---|
| | Items | | | Comparative Example 5 | Comparative Example 6 |
| Blending of Adhesive layer (parts by mass) | Base resin (Amorphous resin) | Vylon GK890 (Toyobo) | Saturated polyester (Acid value: 5 KOHmg/g) | — | 100 |
| | | Vylon 500 (Toyobo) | Saturated polyester (Acid value: <2 KOHmg/g) | 100 | — |
| | Epoxy resin | 154 (Mitsubishi Chemical Corp.) | Phenol Novolac type | 2 | — |
| | Filler (B) | SAYTEX 8010 | Bromine-based flame retardant (average particle diameter: 5.6 μm) | 100 | — |
| | | KISUMA 5A (Kyowa Chemical Industry) | Average particle diameter (d50): 0.94 μm, specific gravity: 2.3 | — | 100 |
| Resin film | PET | Lumirror S10 | Thickness: 25 μm | Applied | Applied |

TABLE 4-continued

|  | Items |  | Composition | |
|---|---|---|---|---|
|  |  |  | Comparative Example 5 | Comparative Example 6 |
| Characteristic Evaluation | Varnish storage stability | No sedimentation | x | x |
|  | Initial bonding strength | 0.7 N/mm or more | ○ | ○ |
|  | Flame retardant property | VTM-2 or more | ○ | ○ |
|  | Transparency | Luminous transmittance 30% or more | x | x |
|  | TMA durability | Intrusion ratio: 50% or less | x | x |

In Examples 1 to 4, good results were obtained all in the TMA durability, initial bonding strength, and heat-resistant bonding strength. Further, in Examples 5 to 9, good results were obtained all in the varnish storage stability, initial bonding strength, flame retardant property, transparency, and TMA durability.

Particularly, in Examples 1 to 9, the TMA durability was good (that is, the intrusion ratio of the probe at 200° C. is 50% or less). Therefore, even though a terminal portion of the sample prepared in Examples 1 to 9 is fitted into a connector and installed in a high temperature environment which is higher than a softening temperature of the adhesive layer under the condition where the terminal portion regularly receives the pressure from the connector, the adhesive will hardly flow, so that the adhesive layer will hardly become thin and the conductor of the terminal portion will hardly float or displace.

In Comparative examples 1, 2 and 6, the epoxy resin is not used. Because the crosslinked structure is not introduced, the TMA durability is insufficient.

In Comparative example 3, the bifunctional epoxy resin having the epoxy equivalent greater than 300 g/eq is used. Because there are few crosslinked structures, the TMA durability is insufficient.

In Comparative examples 4 and 5, the amorphous resin having the acid value less than 5 KOHmg/g is used. Because there are few crosslinked structures, the TMA durability is insufficient.

Namely, in Comparative examples 1 to 6, the TMA durability is insufficient (that is, the intrusion ratio of the probe at 200° C. is greater than 50%). Therefore, if a terminal portion of the sample prepared in Comparative 3 xamples 1 to 6 is fitted into a connector and installed in a high temperature environment which is higher than a softening temperature of the adhesive layer under the condition where the terminal portion regularly receives the pressure from the connector, the adhesive will flow, so that the adhesive layer will become thin and the conductor of the terminal portion will float or displace.

Note that the present invention is not limited to the detailed description of the preferred embodiment and the Examples, and various modifications are possible. For example, the adhesive film 10 may include another adhesive layer in addition to the adhesive layer 2.

What is claimed is:

1. An adhesive film, comprising:
  a resin film; and
  an adhesive layer provided on the resin film, wherein the adhesive layer comprises:
  a resin composition consisting of:
    an epoxy resin having two or more epoxy groups in molecules and having epoxy equivalents of 300 g/eq or less, and an amorphous resin which is dissolved in a solvent and has a plurality of carboxyl groups in molecules, and which has a glass transition temperature of 100° C. or less and an acid value of 10 KOHmg/g or more; and
    a flame retardant;
  a filler (A) having a specific surface area (m$^2$/g) of 90 or more by a BET method; and
  a filler (B) having an average particle diameter (median diameter) of 1 μm or more and 10 μm or less by a laser diffraction method,
  wherein an amount of the resin composition is 2 parts by mass or more of the epoxy resin per 100 parts by mass of the amorphous resin.

2. The adhesive film according to claim 1, wherein an amount of the filler (B) is 5 parts by mass or more and 150 parts by mass or less per 100 parts by mass of the amorphous resin.

3. The adhesive film according to claim 1, wherein the amorphous resin is selected from the group consisting of a saturated polyester resin and a polyester polyurethane resin.

4. The adhesive film according to claim 1, wherein the resin film comprises a polyimide film.

5. The adhesive film according to claim 1, wherein the amorphous resin comprises a transparent material.

6. The adhesive film according to claim 1, wherein the epoxy resin comprises a transparent material.

7. An adhesive film, comprising:
  a resin film; and
  an adhesive layer provided on the resin film, wherein the adhesive layer comprises:
  a resin composition consisting of:
    an epoxy resin having two or more epoxy groups in molecules and having epoxy equivalents of 300 g/eq or less;
    an amorphous resin which is dissolved in a solvent and has a plurality of carboxyl groups in molecules, and which has a glass transition temperature of 100° C. or less and an acid value of 10 KOHmg/g or more; and
    a flame retardant;
  a filler (A) having a specific surface area (m$^2$/g) of 90 or more by a BET method; and
  a filler (B) having an average particle diameter (median diameter) of 1 μm or more and 10 μm or less by a laser diffraction method,
  wherein an amount of the resin composition is 2 parts by mass or more of the epoxy resin per 100 parts by mass of the amorphous resin, and wherein a specific gravity of the flame retardant is 1.5 or less.

8. The adhesive film according to claim 7, wherein each of the amorphous resin and the epoxy resin comprises a transparent material and the flame retardant comprises aluminum diethyl phosphinate.

9. A flat wiring member, comprising:

a conductor; and an adhesive film provided to sandwich the conductor, the adhesive film comprising a resin film and the adhesive layer provided on the resin film, wherein the adhesive layer comprises:

a resin composition consisting of:

an epoxy resin having two or more epoxy groups in molecules and having epoxy equivalents of 300 g/eq or less, and an amorphous resin, which is dissolved in a solvent and has a plurality of carboxyl groups in molecules, and which has a glass transition temperature of 100° C. or less and an acid value of 10 KOHmg/g or more; and a flame retardant;

a filler (A) having a specific surface area (m$^2$/g) of 90 or more by a BET method; and a filler (B) having an average particle diameter (median diameter) of 1 μm or more and 10 μm or less by a laser diffraction method, wherein the adhesive layer has a crosslinked structure formed by reactions between the carboxyl group of the amorphous resin and the epoxy group of the epoxy resin, and wherein a ratio of an intrusion of a detection stick with respect to a thickness of the adhesive layer at a temperature of 200° C., in a TMA curve (wherein a diameter of an indenter at a tip of the detection stick is 0.5 mm, a load is 0.5N, and a temperature increasing rate is 5° C./m) provided by JIS K7196, is not more than 50%.

10. The flat wiring member according to claim 9, wherein an amount of the epoxy resin and an amount of the amorphous resin are 2 parts by mass or more of the epoxy resin per 100 parts by mass of the amorphous resin.

11. The flat wiring member according to claim 9, wherein each of the amorphous resin and the epoxy resin comprises a transparent material.

12. The flat wiring member according to claim 9, wherein an amount of the filler (B) is 5 parts by mass or more and 150 parts by mass or less per 100 parts by mass of the amorphous resin is provided.

* * * * *